US012140292B2

(12) United States Patent
Chen

(10) Patent No.: US 12,140,292 B2
(45) Date of Patent: Nov. 12, 2024

(54) LIGHT SOURCE DEVICE WITH POSITION ADJUSTMENT MECHANISM

(71) Applicant: GUANGZHOU UNIONLUX ELECTRONIC TECHNOLOGY CO., LTD., Guangdong (CN)

(72) Inventor: Guoping Chen, Guangdong (CN)

(73) Assignee: GUANGZHOU UNIONLUX ELECTRONIC TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/927,735

(22) PCT Filed: Jun. 23, 2022

(86) PCT No.: PCT/CN2022/100912

§ 371 (c)(1),
(2) Date: Nov. 24, 2022

(87) PCT Pub. No.: WO2023/011037

PCT Pub. Date: Feb. 9, 2023

(65) Prior Publication Data

US 2024/0230063 A1 Jul. 11, 2024

(30) Foreign Application Priority Data

Aug. 4, 2021 (CN) ......................... 202110891624.7

(51) Int. Cl.
*F21V 14/06* (2006.01)
*F21V 5/00* (2018.01)
(Continued)

(52) U.S. Cl.
CPC .............. *F21V 14/06* (2013.01); *F21V 5/007* (2013.01); *F21Y 2105/10* (2016.08); *F21Y 2113/00* (2013.01); *F21Y 2115/10* (2016.08)

(58) Field of Classification Search
CPC ...... F21V 14/06; F21V 5/007; F21Y 2105/10; F21Y 2115/10
See application file for complete search history.

(56) References Cited

U.S. PATENT DOCUMENTS

| | | | | |
|---|---|---|---|---|
| 6,769,777 | B1 * | 8/2004 | Dubin | F21V 9/14 353/38 |
| 8,657,464 | B2 * | 2/2014 | Lundberg | F21S 10/023 362/232 |
| 10,683,982 | B2 * | 6/2020 | Hessling-Von Heimendahl | F21S 8/003 |
| 2002/0048234 | A1 | 4/2002 | Terashi et al. | |

(Continued)

FOREIGN PATENT DOCUMENTS

| | | | |
|---|---|---|---|
| CN | 102767781 A | | 11/2012 |
| CN | 206112693 U | * | 4/2017 |

(Continued)

OTHER PUBLICATIONS

Jiang, Novel optical components and stage lighting department that has it are all, 2017, CN206112693U, https://worldwide.espacenet.com/patent/search/family/058526662/publication/CN206112693U?q=pn%3DCN206112693U (Year: 2017).*

*Primary Examiner* — Tracie Y Green
*Assistant Examiner* — Michael Chiang
(74) *Attorney, Agent, or Firm* — Samson G. Yu

(57) ABSTRACT

The disclosure relates to a light source system. The light source system comprises: a light source adjustment device, comprising a light source mechanism, a collimating lens mechanism for collimating light beams emitted by the light source mechanism, and a position adjustment mechanism connected to the collimating lens mechanism and configured for adjusting a relative position between the collimating lens mechanism and the light source mechanism; and a focusing lens, which is arranged in a light emergent direction of the
(Continued)

collimating lens mechanism and is configured for converging the light beams collimated by the collimating lens mechanism; wherein the light source mechanism is provided with at least one illuminant group, and the at least one illuminant group comprises at least two different illuminants. In the disclosure, at least two different illuminants are provided on a light source.

18 Claims, 5 Drawing Sheets

(51) Int. Cl.

| | |
|---|---|
| *F21Y 105/10* | (2016.01) |
| *F21Y 113/00* | (2016.01) |
| *F21Y 115/10* | (2016.01) |

(56) References Cited

U.S. PATENT DOCUMENTS

| | | | | |
|---|---|---|---|---|
| 2014/0185285 | A1* | 7/2014 | Jorgensen .......... | G02B 19/0066 362/232 |
| 2015/0167935 | A1 | 6/2015 | Beghelli | |
| 2015/0211708 | A1* | 7/2015 | Stavely ................ | G02B 3/0056 362/231 |

FOREIGN PATENT DOCUMENTS

| | | | |
|---|---|---|---|
| CN | 206918948 | U | 1/2018 |
| CN | 109973912 | A | 7/2019 |
| CN | 209540750 | U | 10/2019 |
| CN | 110778939 | A | 2/2020 |
| CN | 211551266 | U | 9/2020 |
| CN | 213840781 | U | 7/2021 |
| CN | 113531441 | A | 10/2021 |

* cited by examiner

LIGHT SOURCE DEVICE WITH POSITION ADJUSTMENT MECHANISM

TECHNICAL FIELD

The disclosure relates to the field of optical technologies, and in particular, to a light source system.

BACKGROUND

Most of existing stage light sources use LED light sources, and during collimation of the stage light source structure, a lens unit is aligned with the optical center of an LED chip, so as to achieve an optimal collimation effect; however, light spot effects presented by a single LED chip are all single effects, and if light spot effects of different color temperatures or different colors or different shapes need to be realized, the light source module needs to be replaced, which is time and labor consuming, and cannot meet current requirements in a better way. Moreover, if two or more LED chips are arranged on one chip unit to correspond to the same lens unit, the lens unit cannot be aligned with the optical centers of all the LED chips for optimal collimation, and the light spot effect presented thereby cannot reach the stage light standard. Therefore, the existing LED light source module generally cannot present different light spots, has a single light emitting effect, and cannot meet the diversified requirements.

SUMMARY

In view of this, it is necessary to provide a light source system solving the problem that the existing LED light source module generally cannot present different light spots, has a single light emitting effect, and cannot meet the diversified requirements.

A light source system, including:

a light source adjustment device, including a light source mechanism, a collimating lens mechanism for gathering and/or collimating light beams emitted by the light source mechanism, and a position adjustment mechanism connected to the collimating lens mechanism and configured for adjusting a relative position between the collimating lens mechanism and the light source mechanism; and a focusing lens, which is arranged in a light emergent direction of the collimating lens mechanism and is configured for converging the light beams gathered and/or collimated by the collimating lens mechanism;

wherein the light source mechanism is provided with at least one illuminant group, and the at least one illuminant group includes at least two different illuminants; and the position adjustment mechanism includes a first fixing seat assembly fixedly connected to the collimating lens mechanism, a first shaft rod assembly slidably connected to the first fixing seat assembly, and a driving member for driving the first fixing seat assembly to move in the axis direction of the first shaft rod assembly.

In the technical solutions, light emitted by the light source mechanism is light beams having a relatively large divergence angle, and after being gathered and/or collimated by the collimating lens mechanism, the divergence angle of the emitted light beams can be converged and then a focused light spot is emitted via a subsequent optical assembly, or the emitted light beams can be collimated into near parallel light, the light rays are substantially oriented in the same direction, and then after being converged by a focusing lens, the light is focused on a preset surface to form a focused light spot.

In one of the embodiments, the at least one illuminant group includes two different illuminants, and a distance between optical centers of the two different illuminants is consistent with a sliding stroke of the first fixing seat assembly.

In one of the embodiments, each of the at least two different illuminants is a single LED chip; or each of the at least two different illuminants includes at least two linearly arranged LED chips; or each of the at least two different illuminants includes a plurality of LED chips arranged in an array.

In one of the embodiments, the collimating lens mechanism includes a first collimating lens structure, a second collimating lens structure, and a lens support connected to the position adjustment mechanism, wherein the first collimating lens structure and the second collimating lens structure are provided on the lens support, the first collimating lens structure includes at least one first lens, the second collimating lens structure includes at least one second lens, and each of the at least one second lens and each of the at least one first lens are arranged on one-to-one correspondence.

In one of the embodiments, the driving member includes two solenoid valve units, and the two solenoid valve units are respectively connected to two opposite sides of the first fixing seat assembly.

In one of the embodiments, the first fixing seat assembly includes a shaft sleeve for slidably connecting to the first shaft rod assembly, and a connector connected to the shaft sleeve and configured for fixedly connecting to the collimating lens mechanism.

In one of the embodiments, the connector includes a first limiting portion for limiting the collimating lens mechanism in a first direction, and/or the connector includes a second limiting portion for limiting the collimating lens mechanism in a second direction; wherein the second direction and the first direction form an angle therebetween, or the second direction and the first direction are perpendicular to each other.

In one of the embodiments, the connector includes a connecting plate connected to the shaft sleeve and provided with connecting holes; and/or the connector includes a slot fitted with the collimating lens mechanism.

In one of the embodiments, the connecting plate is located below the collimating lens mechanism and is configured for bearing the collimating lens mechanism.

In one of the embodiments, a light homogenization device is further provided between the collimating lens mechanism and the focusing lens.

In one of the embodiments, the position adjustment mechanism further includes a guiding unit for guiding a displacement of the collimating lens mechanism.

In one of the embodiments, the guiding unit includes a second fixing seat assembly connected to the collimating lens mechanism, and a second shaft rod assembly slidably connected to the second fixing seat assembly; wherein the second fixing seat assembly and the first fixing seat assembly are respectively provided at two opposite sides of the collimating lens mechanism, and a sliding stroke of the second fixing seat assembly is larger than a sliding stroke of the first fixing seat assembly.

The beneficial effects of the described technical solution at least include:

in the technical solution, at least two different illuminants are provided on a light source, wherein the different illuminants are different from each other in terms of at least one of the color, color temperature, quantity or shape, so that a light source mechanism can emit at least two different light beams. In addition, in the present technical solution, a position adjustment mechanism is provided to be connected to a collimating lens mechanism, so as to control the collimating lens mechanism to have a displacement relative to the light source mechanism, so that the lens unit on the collimating lens mechanism can be aligned with different illuminants for light gathering or collimation, thereby realizing different light spot effects.

100. light source adjustment device; 10. light source mechanism; 11. illuminant group; 20. collimating lens mechanism; 30. position adjustment mechanism; 31. first fixing seat assembly; 311. shaft sleeve; 312. connector; 3121. first limiting portion; 3122. second limiting portion; 32. first shaft rod assembly; 321. first optical shaft; 322. first fixing bracket; 323. first limiting block; 33. driving member; 331. electromagnetic valve unit; 40. guiding unit; 41. second fixing seat assembly; 42. second shaft rod assembly; 421. second optical shaft; 422. second fixing bracket; 423. second limiting block; 50. third limiting unit; 200. focusing lens.

DETAILED DESCRIPTION OF THE EMBODIMENTS

To make the objectives, features, and advantages of the disclosure clearer and more comprehensible, the following describes the specific embodiments of the disclosure in detail with reference to the drawings. In the following description, numerous specific details are set forth in order to provide a thorough understanding of the disclosure. However, the disclosure may be implemented in many different forms than those described herein, those skilled in the art may make similar modifications without departing from the scope of the disclosure, and thus the disclosure is not limited to the specific embodiments disclosed below.

Figure 1:
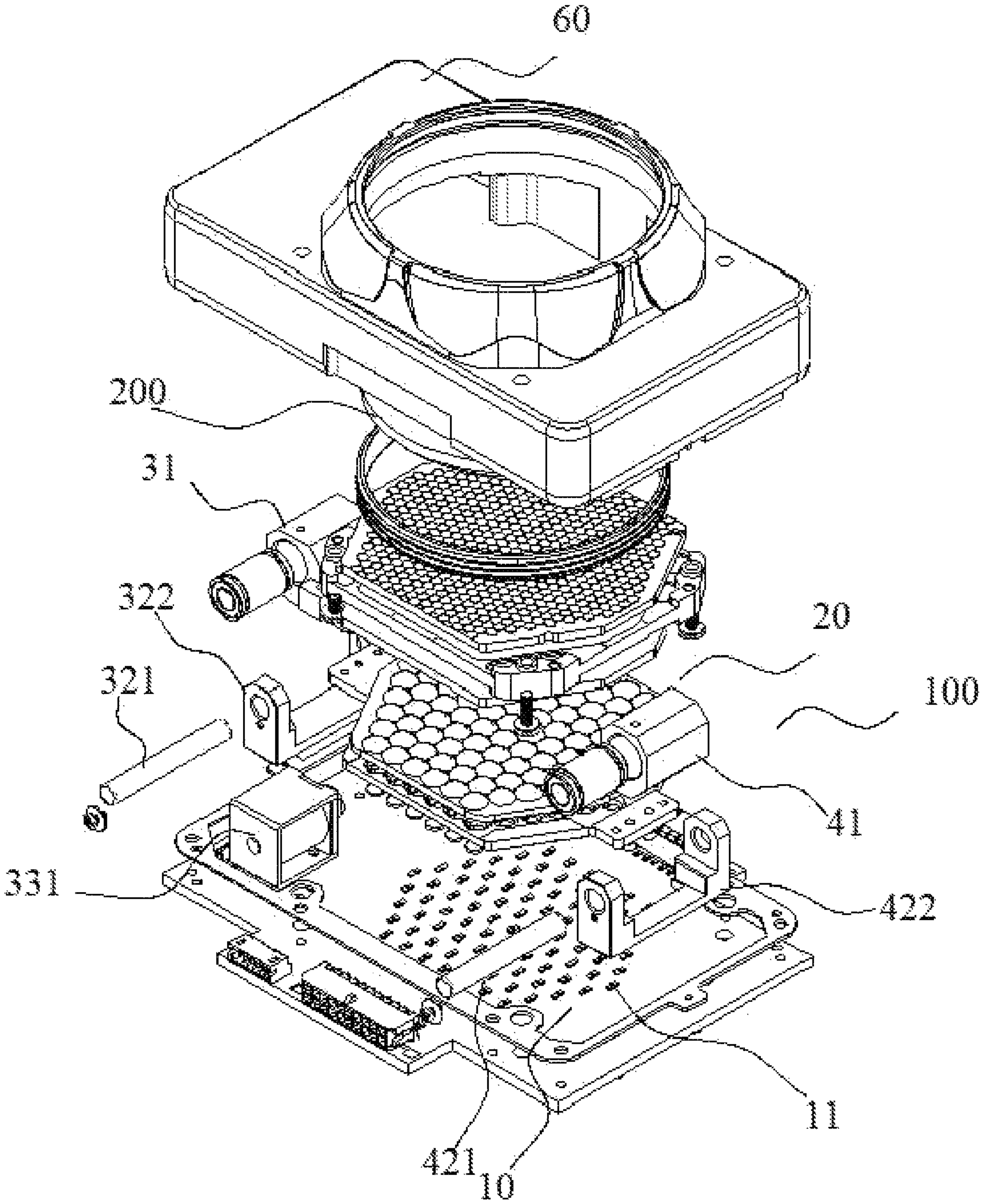
FIG. 1 is a schematic exploded view of a light source system according to an embodiment of the disclosure.
Figure 2:
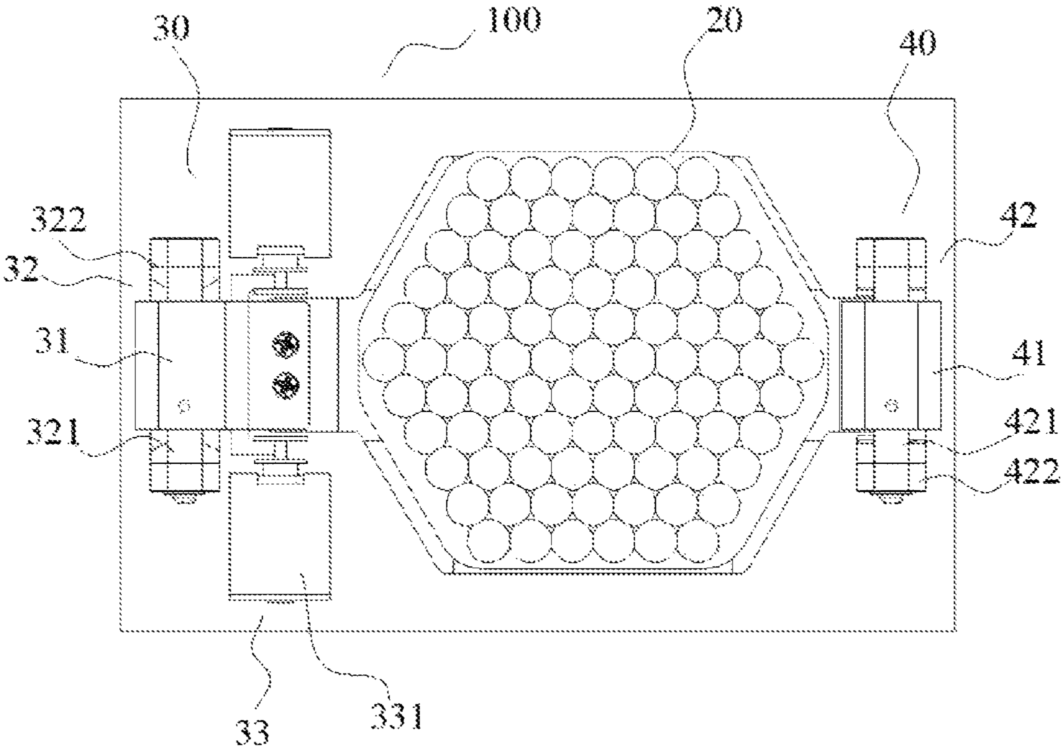
FIG. 2 is a schematic structural diagram of a light source adjustment device according to an embodiment of the disclosure.

As shown in FIG. 1 to FIG. 2, a light source system includes:

a light source adjustment device 100, including a light source mechanism 10, a collimating lens mechanism 20 for gathering and/or collimating light beams emitted by the light source mechanism 10, and a position adjustment mechanism 30 connected to the collimating lens mechanism 20 and configured for adjusting a relative position between the collimating lens mechanism 20 and the light source mechanism 10; and a focusing lens 200, which is arranged in a light emergent direction of the collimating lens mechanism 20 and is configured for converging the light beams gathered and/or collimated by the collimating lens mechanism;

wherein the light source mechanism 10 is provided with at least one illuminant group 11, and the at least one illuminant group 11 includes at least two different illuminants; and the position adjustment mechanism 30 includes a first fixing seat assembly 31 fixedly connected to the collimating lens mechanism 20, a first shaft rod assembly 32 slidably connected to the first fixing seat assembly 31, and a driving member 33 for driving the first fixing seat assembly 31 to move in the axis direction of the first shaft rod assembly 32.

In this embodiment, light emitted by the light source mechanism 10 is light beams having a relatively large divergence angle, and after being gathered and/or collimated by the collimating lens mechanism 20, the divergence angle of the emitted light beams can be converged and then a focused light spot is emitted via a subsequent optical assembly (such as a lens array, a light homogenization structure, and a focusing lens), or the emitted light beams can be collimated into near parallel light, the light rays are substantially oriented in the same direction, and then after being converged by a focusing lens 200, the light is focused on a preset surface to form a focused light spot.

In this embodiment, at least two different illuminants are provided on a light source, wherein the different illuminants are different from each other in terms of at least one of the color, color temperature, quantity or shape, so that a light source mechanism 10 can emit at least two different light beams. In addition, in this embodiment, a position adjustment mechanism 30 is provided to be connected to a collimating lens mechanism 20, so as to control the collimating lens mechanism 20 to have a displacement relative to the light source mechanism 10, so that the lens unit on the collimating lens mechanism 20 can be aligned with different illuminants for gathering and/or collimation, thereby realizing different light spot effects.

Specifically, the illuminants in this embodiment can be single chips, a plurality of chips, or lamp beads, etc., the chips can be bare chips or packaged chips, and the types of the chips can be LED chips or VCSELs.

Embodiment 1

In this embodiment, the at least one illuminant group 11 including two different illuminants is taken as an embodiment, and in other embodiments, two or more different illuminants are able to be included. In this embodiment, when the light source adjustment device 100 is in an initial position, the collimating lens mechanism 20 is located in a first position, the lens unit of the collimating lens mechanism 20 is aligned with the first illuminant and collimates the light beam emitted thereby, and the collimated light beam is converged by the focusing lens 200 to form the first light spot effect; when the light spot effect needs to be changed, the driving member 33 drives the first fixing assembly to move in the axis direction of the first shaft rod assembly 32, so that the collimating lens mechanism 20 is located in a second position, the lens unit of the collimating lens mechanism 20 is aligned with the second illuminant and collimates the light beam emitted thereby, and the collimated light beam is converged by the focusing lens 200 to form the second light spot effect. By the same reasoning, in other embodiments, if the mth light spot effect needs to be realized, the driving member 33 drives the collimating lens mechanism 20 to be located in a mth position, so that the lens unit is aligned with the mth illuminant.

In this embodiment, the axis of the first shaft rod assembly 32 is parallel to the arrangement direction of the illuminants. In this embodiment, the axis direction of the first shaft rod assembly 32 is set to be parallel to the arrangement direction of the illuminants, and then the sliding direction of the first fixing seat assembly 31 on the first shaft rod assembly is parallel to the arrangement direction of the illuminants, so that the collimating lens mechanism 20 is aligned with the optical centers of different illuminants respectively before and after displacement.

The light source adjustment device 100 further includes a housing 60, and the housing 60 covers the light source mechanism, the collimating lens mechanism and the position adjustment mechanism.

A distance between the optical centers of the two different illuminants is consistent with the sliding stroke of the first fixing seat assembly 31, so that when the first fixing seat assembly 31 is located in two limit positions, the lens unit of the collimating lens mechanism 20 is aligned with two different illuminants, thereby facilitating limit control.

In this embodiment, each of the illuminants is a single LED chip; and in other embodiments, each of the illuminants includes at least two linearly arranged LED chips, or each of the illuminants includes a plurality of LED chips arranged in an array. Different LED chips are able to be LED chips with different colors, are also able to be LED chips with different color temperatures, and are also able to be LED chips with different light emitting powers.

Specifically, the illuminant group 11 of this embodiment is provided on an LED substrate.

In this embodiment, the collimating lens mechanism 20 includes a first collimating lens structure, a second collimating lens structure, and a lens support connected to the position adjustment mechanism 30, wherein the first collimating lens structure and the second collimating lens structure are provided on the lens support; the first collimating lens structure includes at least one first lens, the second collimating lens structure includes at least one second lens, and each of the at least one second lens and each of the at least one first lens are arranged on one-to-one correspondence; and the first lens corresponds to the illuminant group 11 on a one-to-one correspondence. The light emitted by the LED chip is light in Lambertian distribution, and the light beams have a relatively large divergence angle. After the light beams emitted by the light source mechanism 10 pass through the first collimating lens structure and the second collimating lens structure, the light beams can be gathered and collimated, and are collimated into parallel light or near parallel light, and then are emitted through the focusing lens 200.

In this embodiment, the driving member 33 includes two solenoid valve units 331, and the two solenoid valve units 331 are respectively connected to two opposite sides of the first fixing seat assembly, so that the two solenoid valve units 331 can respectively drive the first fixing assembly to move in a first direction and a second direction that are opposite to each other, thereby implementing the reciprocating motion of the first fixing assembly and driving the position adjustment mechanism 30 to switch between the first position and the second position, so as to realize two different light spot effects.

Figure 5:
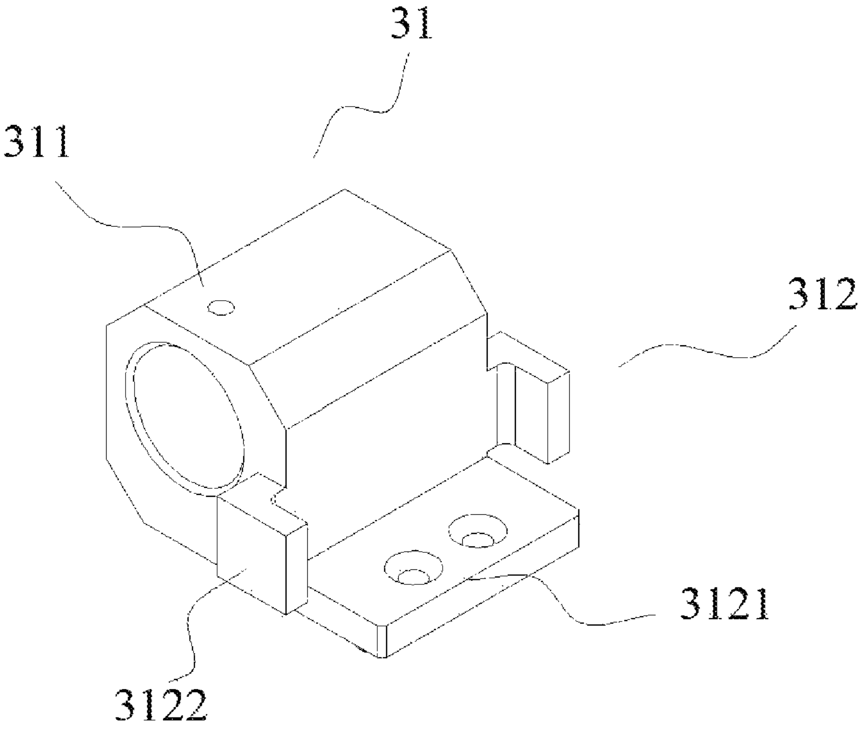
FIG. 5 is a schematic structural diagram of a first fixing seat assembly according to an embodiment of the disclosure.

As shown in FIG. 5, in this embodiment, the first fixing seat assembly 31 includes a shaft sleeve 311 for slidably connecting to the first shaft rod assembly 32, and a connector 312 connected to the shaft sleeve 311 and configured for fixedly connecting to the collimating lens mechanism 20; and the shaft sleeve 311 is fitted with the first shaft rod assembly 32 in an inserted manner.

In order to improve the strength of the connection between the first fixing seat assembly 31 and the collimating lens mechanism 20, so as to avoid affecting the collimating effect because the collimating lens mechanism 20 shaking or jumping in the displacement process affects the displacement accuracy, in this embodiment, the connector 312 includes a first limiting portion 3121 for limiting the collimating lens mechanism 20 in a first direction, and a second limiting portion 3122 for limiting the collimating lens mechanism 20 in a second direction, wherein the second direction and the first direction form an angle therebetween, so that the collimating lens mechanism 20 can be limited in different directions, thereby further ensuring the reliability and stability of the connection between the collimating lens mechanism 20 and the connector 312.

Preferably, in this embodiment, the second direction and the first direction are perpendicular to each other, that is, the up-down jumping and the left-right shaking of the collimating lens mechanism 20 are restrained by means of the first direction and the second direction, respectively.

Specifically, in this embodiment, the connector 312 includes a connecting plate connected to the shaft sleeve 311 and provided with connecting holes, and a slot fitted with the collimating lens mechanism 20. The connecting plate is the first limiting portion 3121, and the slot is the second limiting portion 3122. The connecting plate is provided with two connecting holes, and is connected to the collimating lens mechanism 20 by means of bolts or screws, and the axis of the two connecting holes is perpendicular to the displacement direction of the collimating lens mechanism 20, so that the up-down jumping of the collimating lens mechanism 20 is restrained after the screws are tightened. The width of the slot matches the width of the connection part of the collimating lens mechanism 20, thus avoiding the left-right shaking of the collimating lens mechanism 20.

Further, in this embodiment, the connecting plate is located below the collimating lens mechanism 20 and is configured for bearing the collimating lens mechanism 20, and balances and shares the interference stress generated by the collimating lens mechanism 20 on the first fixing seat assembly 31, enabling the stable connection between the first fixing seat assembly 31 and the collimating lens mechanism 20, and avoiding the deformations of the first fixing seat assembly 31 and the collimating lens mechanism 20 caused by the concentration of the connection stress.

In addition, in order to assist the sliding of the collimating lens mechanism 20, so that the sliding of the collimating lens mechanism 20 is smooth and steady and the sliding accuracy is ensured, and the position adjustment mechanism 30 further includes a guiding unit 40 for guiding the displacement of the collimating lens mechanism 20.

In this embodiment, the guiding unit 40 includes a second fixing seat assembly 41, and a second shaft rod assembly 42 slidably connected to the second fixing seat assembly 41; wherein the second fixing seat assembly 41 and the first fixing seat assembly 31 are respectively provided at two opposite sides of the collimating lens mechanism 20, and the axis direction of the second shaft rod assembly 42 is parallel to the axis direction of the first shaft rod assembly 32. In other embodiments, the first fixing seat assembly 31 and the second fixing seat assembly 41 can also be provided to be respectively located on adjacent sides of the collimating lens mechanism 20, and in this case, the axis direction of the second shaft rod assembly 42 and the axis direction of the first shaft rod assembly 32 can be adjusted correspondingly.

Specifically, the first shaft rod assembly 32 includes a first optical shaft 321 slidably fitted with the first fixing seat assembly 31, and a first fixing bracket 322 for fixing the first optical shaft 321. The first optical shaft 321 is fixed to a frame or a substrate of the light source system by means of the first fixing bracket 322, wherein the frame or the substrate is used to mount or integrate various mechanisms or assemblies of the light source system. The first fixing seat assembly 31 is fitted with the first optical shaft 321 in an inserted manner, so that the first fixing seat assembly can slide in the axis direction of the first optical shaft 321; and a first linear bearing is provided between the first fixing seat assembly 31 and the first optical shaft 321, so that the first fixing seat assembly 31 can perform stable linear movement with high sensitivity and high accuracy.

In addition, as the distance between the optical centers of different illuminants is short, in order to improve the displacement accuracy of the collimating lens mechanism 20 so as to be aligned with the optical centers of the different illuminants, the light source adjustment device 100 further includes first limiting units for limiting the sliding stroke of the first fixing seat assembly 31; furthermore, the first fixing bracket 322 is provided with first limiting units for limiting the sliding stroke of the first fixing seat assembly 31.

In this embodiment, the light source mechanism 10 is provided with illuminant groups 11 arranged in an array, and each illuminant group 11 includes two illuminants. In other embodiments, each illuminant group 11 may also include two or more illuminants. In other embodiments, the illuminant groups 11 may not be completely the same, for embodiment, most illuminant groups 11 are composed of two illuminants, and only some illuminant groups at the edge are each provided with one illuminant.

Figure 3:
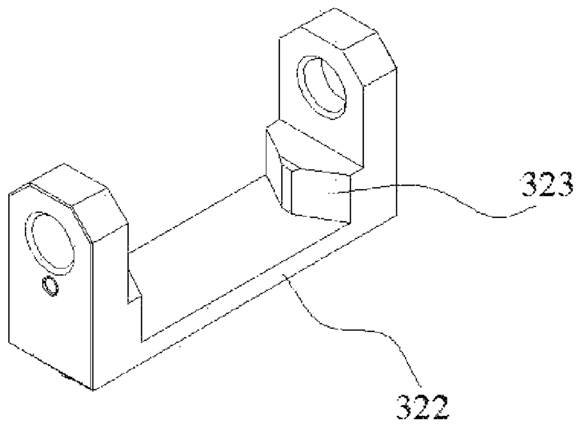
FIG. 3 is a first schematic structural diagram of a first fixing bracket according to an embodiment of the disclosure.
Figure 4:
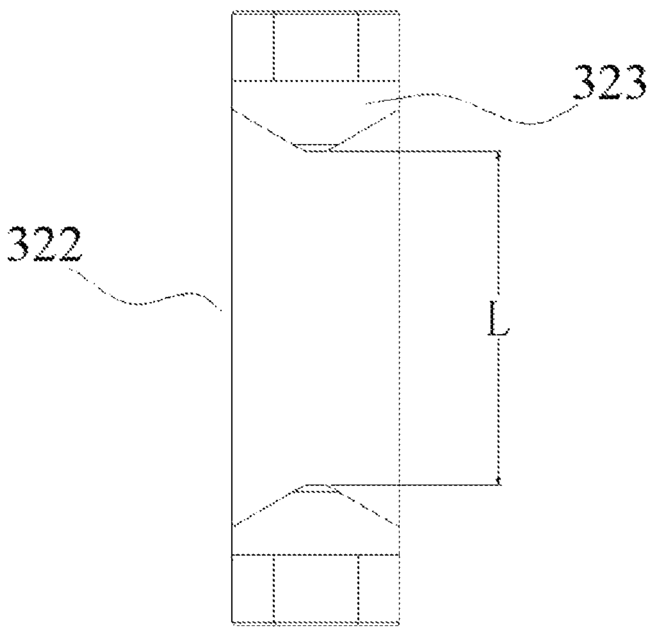
FIG. 4 is a second schematic structural diagram of a first fixing bracket according to an embodiment of the disclosure.

As shown in FIG. 3 to FIG. 4, in this embodiment, the first fixing bracket 322 is a U-shaped bracket, two ends of the first optical shaft 321 are fixedly connected to two opposite sides of the U-shaped bracket respectively, inner walls of the two opposite sides of the U-shaped bracket are respectively provided with first limiting blocks 323 for limiting the sliding stroke of the first fixing seat assembly 31, and the first limiting blocks 323 are the first limiting units. The first limiting blocks 323 on both sides respectively restrain the two limit positions of the first fixing seat assembly 31 when moving, so that the collimating lens mechanism 20 is respectively located in the first position and second position, thereby realizing the collimation of the two illuminants.

Similar to the first shaft rod assembly 32, the second shaft rod assembly 42 includes a second optical shaft 421 slidably fitted with the second fixing seat assembly 41, and a second fixing bracket 422 for fixing the second optical shaft 421. The second optical shaft 421 is fixed on a frame or a substrate of the light source system by means of the second fixing bracket 422, the second fixing seat assembly 41 is fitted with the second optical shaft 421 in an inserted manner, so that the second fixing seat assembly can slide in the axis direction of the second optical shaft 421; and a second linear bearing is provided between the second fixing seat assembly 41 and the second optical shaft 421, so that the second fixing seat assembly 41 can perform stable linear movement with high sensitivity and high accuracy.

In order to improve the accuracy of the assisted sliding, the light source adjustment device 100 further includes second limiting units for limiting the sliding stroke of the second fixing seat assembly 41.

Further, the second fixing bracket 422 is provided with second limiting units for limiting the sliding stroke of the second fixing seat assembly 41.

Figure 6:
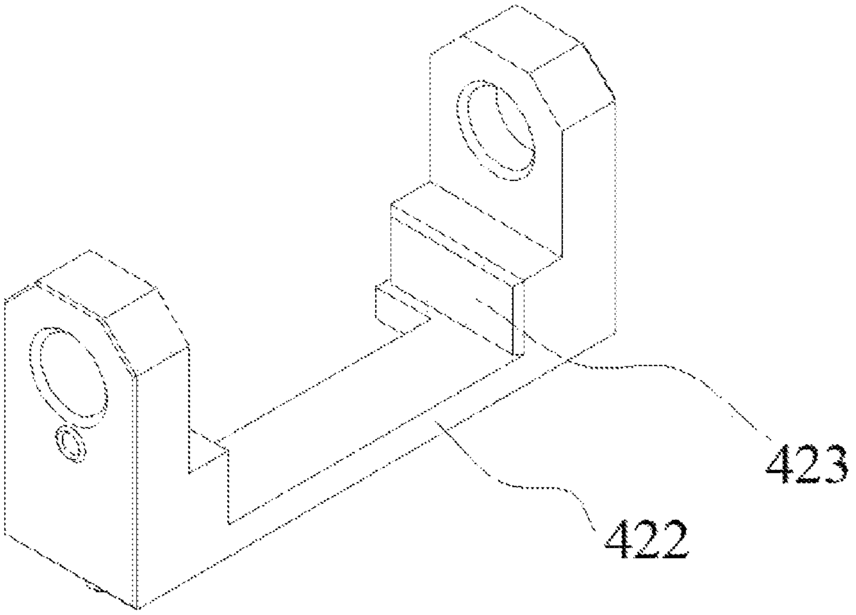
FIG. 6 is a first schematic structural diagram of a second fixing bracket according to an embodiment of the disclosure.
Figure 7:
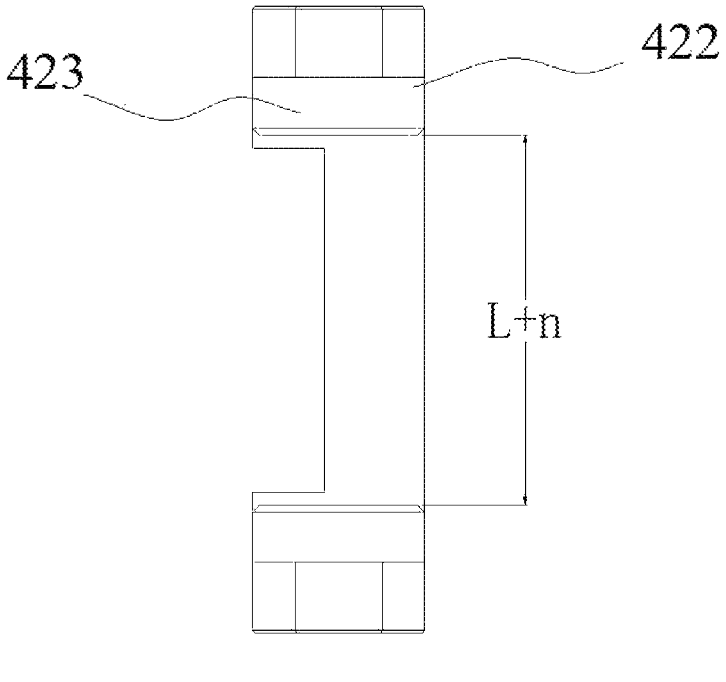
FIG. 7 is a second schematic structural diagram of a second fixing bracket according to an embodiment of the disclosure.

As shown in FIG. 6 to FIG. 7, in this embodiment, the second fixing bracket 422 is a U-shaped bracket, two ends of the second optical shaft 421 are fixedly connected to two opposite sides of the U-shaped bracket respectively, inner walls of the two opposite sides of the U-shaped bracket are respectively provided with second limiting blocks 423 for limiting the sliding stroke of the second fixing seat assembly 41, and the second limiting blocks 423 are the second limiting units. The second limiting blocks 423 on both sides respectively restrain the two limit positions of the second fixing seat assembly 41 when moving.

In addition, if the range of stroke of the first fixing seat assembly 31 is consistent with that of the second fixing seat assembly 41, when there is an assembly error in the assembly process of the guiding unit 40, the travel stroke of the entire position adjustment mechanism 30 will be less than the stroke defined by the first limiting units; therefore, in this embodiment, the sliding stroke of the second fixing seat assembly 41 is set to be greater than the sliding stroke of the first fixing seat assembly 31, i.e. the distance between the two second limiting blocks 423 is greater than the distance between the two first limiting blocks 323.

Specifically, the sliding stroke of the first fixing seat assembly 31 is L, and the sliding stroke of the second fixing seat assembly 41 is L+n, wherein n ranges from 1 mm to 5 mm. In this embodiment, the distance between the two first limiting blocks 323 is 23.8 mm, and the distance between the two second limiting blocks 423 is 25.8 mm, then n is 2 mm.

Further, a light homogenization device is provided between the collimating lens mechanism and the focusing lens, and more specifically, the light homogenization device in this embodiment is a fly's eye lens.

Embodiment 2

The structure and principle of this embodiment are similar to those of Embodiment 1. The difference lies in that, in this embodiment, the at least one illuminant group 11 includes at least three different illuminants, and the position adjustment mechanism 30 further includes a third limiting unit 50 for limiting the sliding stroke of the first fixing seat assembly 31 or the second fixing seat assembly 41, so as to restrain the collimating lens mechanism 20 to be located in a third position or mth position by means of the third limiting unit 50, so that the lens unit is aligned with the third illuminant or the mth illuminant.

Figure 8:
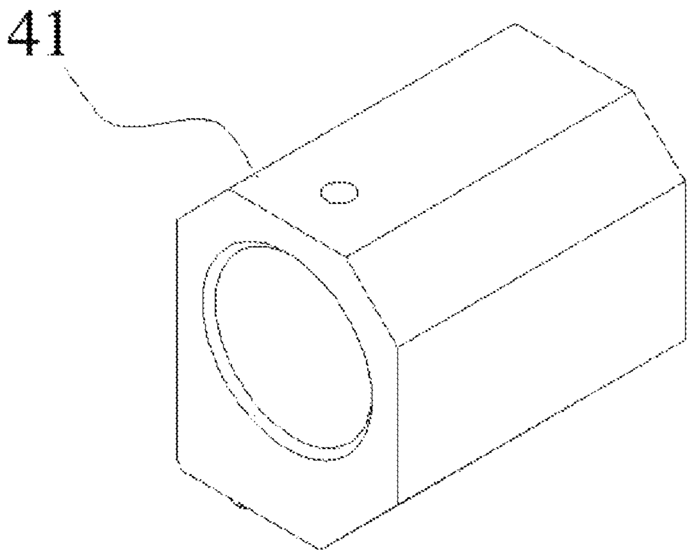
FIG. 8 is a schematic structural diagram of a second fixing seat assembly according to an embodiment of the disclosure.
Figure 9:
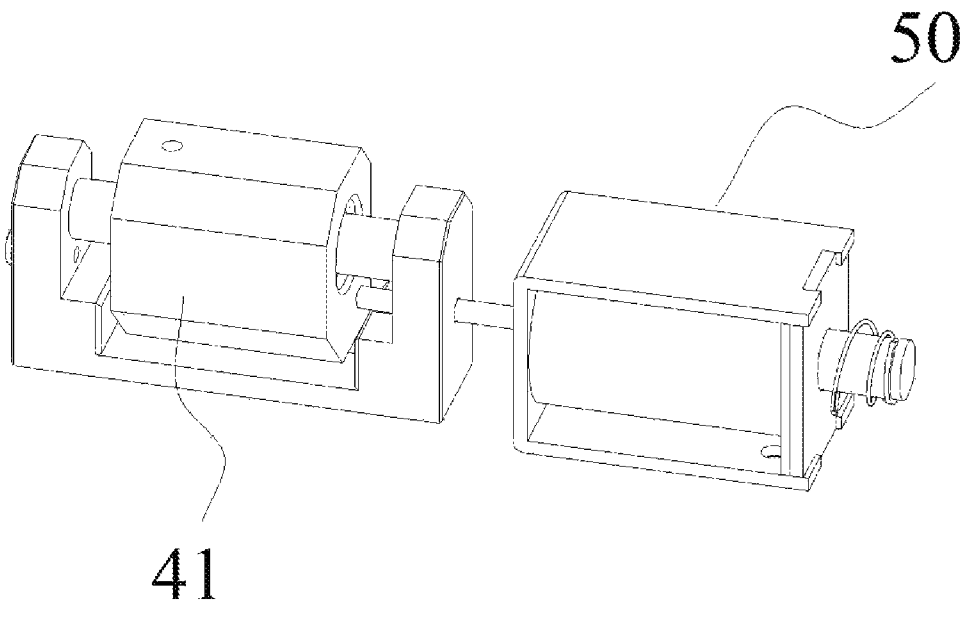
FIG. 9 is a schematic diagram of a third limiting unit in a usage state according to an embodiment of the disclosure.

As shown in FIGS. 1 and 2 in conjunction with FIGS. 8 and 9, in this embodiment, the sliding stroke of the second fixing seat assembly 41 being limited is taken as an embodiment, and in other embodiments, arrangement can also be made to limit the first fixing seat assembly 31. The third limiting unit 50 is a solenoid valve push rod. When the solenoid valve is powered on, the degree of extension and retraction of the push rod can be controlled, and the direction of extension and retraction of the push rod is consistent with the displacement direction of the collimating lens mechanism 20, so that when the collimating lens mechanism 20 moves to the second fixing seat assembly 41 and abuts against the push rod, no further displacement occurs, and in this case, the collimating lens mechanism 20 stays in the position defined by the push rod, and is aligned with the optical center of the third illuminant or the mth illuminant, thereby realizing the collimation of three or more different illuminants.

In the description of the disclosure, it should be understood that, orientation or position relationships indicated by terms such as "center", "longitudinal", "lateral", "length", "width", "thickness", "up", "down", "front", "rear", "left", "right", "vertical", "horizontal", "top", "bottom", "inner", "outer", "clockwise", "counterclockwise", "axial", "radial" and "circumferential" are orientation or position relationships based on those illustrated in the drawings, which are only used to facilitate description of the disclosure and simplify the description, and do not indicate or imply that the device or element referred to must have a specific orientation, or be configured or operated in a specific orientation, and therefore cannot be construed as limitations to the disclosure.

In addition, terms such as "first" and "second" are used herein only for purposes of description and are not intended to indicate or imply relative importance or to implicitly state the number of indicated technical features. Thus, the features defined by "first" and "second" may explicitly or implicitly include at least one of the features. In the description of the disclosure, "a plurality of" means at least two, for embodiment, two, three, etc., unless specified otherwise.

In the disclosure, unless specified or defined otherwise, terms such as "mount", "link", "connect", and "fix" should be understood in a broad sense, and is able to be, for embodiment, fixed connections, detachable connections, or integral forms, is able to be mechanical connections, or electrical connections, is able to be direct connections, or indirect connections via intermediaries, and is able to be communications between the interior of two elements, or interactive relationships of two elements, unless defined otherwise. The specific meanings of the above terms in the disclosure can be understood by those skilled in the art according to specific situations.

In the disclosure, unless specified or defined otherwise, a first feature being "above" or "below" a second feature may refer to the first feature being in direct contact with the second feature, and may also refer to the first feature being in indirect contact with the second feature via an intermediary. Furthermore, a first feature being "over", "above", or "on" a second feature may refer to the first feature being just above or diagonally above the second feature, or merely refer to the first feature being at a level higher than the second feature. A first feature being "underneath", "below" or "under" a second feature may refer to the first feature being just below or diagonally below the second feature, or merely refer to the first feature being at a level lower than the second feature.

It should be noted that when an element is referred to as being "fixed to" or "provided on" another element, the element is able to be directly on the other element or an intermediate element may also exist. When an element is referred to as being "connected" to another element, the element is able to be directly connected to the other element or an intermediate element may also exist at the same time. The terms "perpendicular", "horizontal", "up", "down", "left", "right" and similar expressions as used herein only for illustrative purposes and are not meant to be the exclusive embodiments.

Various technical features of the described embodiments can be combined in any way, and in order to make the description brief, not all possible combinations of the technical features in the described embodiments are described. However, as long as the combinations of these technical features are not contradictory, all should be considered to belong to the scope of disclosure of the present description.

The foregoing embodiments merely represent several implementations of the disclosure, and are described in detail, but are not intended to limit the scope of the patent of the disclosure. It should be noted that, for those skilled in the art, various modifications and improvements can be made without departing from the concept of the disclosure, and all these modifications and improvements belong to the scope of protection of the disclosure. Therefore, the scope of protection of the patent of the disclosure should be subject to the appended claims.

What is claimed is:

1. A light source system, comprising:

a light source adjustment device, comprising a light source mechanism, a collimating lens mechanism for gathering and/or collimating light beams emitted by the light source mechanism, and a position adjustment mechanism connected to the collimating lens mechanism and configured for adjusting a relative position between the collimating lens mechanism and the light source mechanism; and a focusing lens, which is arranged in a light emergent direction of the collimating lens mechanism and is configured for converging the light beams gathered and/or collimated by the collimating lens mechanism;

wherein the light source mechanism is provided with at least one illuminant group, and the at least one illuminant group comprises at least two different illuminants;

the position adjustment mechanism comprises a first fixing seat assembly fixedly connected to the collimating lens mechanism, a first shaft rod assembly slidably connected to the first fixing seat assembly, and a driving member for driving the first fixing seat assembly to move in an axis direction of the first shaft rod assembly;

the first fixing seat assembly comprises a shaft sleeve for slidably connecting to the first shaft rod assembly, and a connector connected to the shaft sleeve and configured for fixedly connecting to the collimating lens mechanism; and the connector comprises a slot fitted with the collimating lens mechanism.

2. The light source system according to claim 1, wherein the at least one illuminant group comprises two different illuminants, and a distance between optical centers of the two different illuminants is consistent with a sliding stroke of the first fixing seat assembly.

3. The light source system according to claim 2, wherein a light homogenization device is further provided between the collimating lens mechanism and the focusing lens.

4. The light source system according to claim 2, wherein the position adjustment mechanism further comprises a guiding unit for guiding a displacement of the collimating lens mechanism.

5. The light source system according to claim 4, wherein the guiding unit comprises a second fixing seat assembly connected to the collimating lens mechanism, and a second shaft rod assembly slidably connected to the second fixing seat assembly; wherein the second fixing seat assembly and the first fixing seat assembly are respectively provided at two opposite sides of the collimating lens mechanism, and a sliding stroke of the second fixing seat assembly is larger than a sliding stroke of the first fixing seat assembly.

6. The light source system according to claim 1, wherein each of the at least two different illuminants is a single LED chip; or each of the at least two different illuminants comprises at least two linearly arranged LED chips; or each of the at least two different illuminants comprises a plurality of LED chips arranged in an array; or each of the at least two different illuminant is packaged LED chip.

7. The light source system according to claim 6, wherein a light homogenization device is further provided between the collimating lens mechanism and the focusing lens.

8. The light source system according to claim 6, wherein the position adjustment mechanism further comprises a guiding unit for guiding a displacement of the collimating lens mechanism.

9. The light source system according to claim 8, wherein the guiding unit comprises a second fixing seat assembly connected to the collimating lens mechanism, and a second shaft rod assembly slidably connected to the second fixing seat assembly; wherein the second fixing seat assembly and the first fixing seat assembly are respectively provided at two opposite sides of the collimating lens mechanism, and a sliding stroke of the second fixing seat assembly is larger than a sliding stroke of the first fixing seat assembly.

10. The light source system according to claim 1, wherein the collimating lens mechanism comprises a first collimating lens structure, a second collimating lens structure, and a lens support connected to the position adjustment mechanism, wherein the first collimating lens structure and the second collimating lens structure are provided on the lens support, the first collimating lens structure comprises at least one first lens, the second collimating lens structure comprises at least one second lens, and each of the at least one second lens and each of the at least one first lens are arranged on one-to-one correspondence.

11. The light source system according to claim 1, wherein the driving member comprises two solenoid valve units, and the two solenoid valve units are respectively connected to two opposite sides of the first fixing seat assembly.

12. The light source system according to claim 1, wherein the connector comprises a first limiting portion for limiting the collimating lens mechanism in a first direction, and/or the connector comprises a second limiting portion for limiting the collimating lens mechanism in a second direction; wherein the second direction and the first direction form an angle therebetween.

13. The light source system according to claim 1, wherein the connector comprises a connecting plate connected to the shaft sleeve and provided with connecting holes; and/or the connector comprises a slot fitted with the collimating lens mechanism.

14. The light source system according to claim 13, wherein the connecting plate is located below the collimating lens mechanism and is configured for bearing the collimating lens mechanism.

15. The light source system according to claim 1, wherein a light homogenization device is further provided between the collimating lens mechanism and the focusing lens.

16. The light source system according to claim 1, wherein the position adjustment mechanism further comprises a guiding unit for guiding a displacement of the collimating lens mechanism.

17. The light source system according to claim 16, wherein the guiding unit comprises a second fixing seat assembly connected to the collimating lens mechanism, and a second shaft rod assembly slidably connected to the second fixing seat assembly; wherein the second fixing seat assembly and the first fixing seat assembly are respectively provided at two opposite sides of the collimating lens mechanism, and a sliding stroke of the second fixing seat assembly is larger than a sliding stroke of the first fixing seat assembly.

18. The light source system according to claim 12, wherein the second direction and the first direction are perpendicular to each other.

* * * * *